T. A. EDISON.
MOLD OR TRANSFER PLATE.
APPLICATION FILED OCT. 26, 1912.
1,234,451.
Patented July 24, 1917.
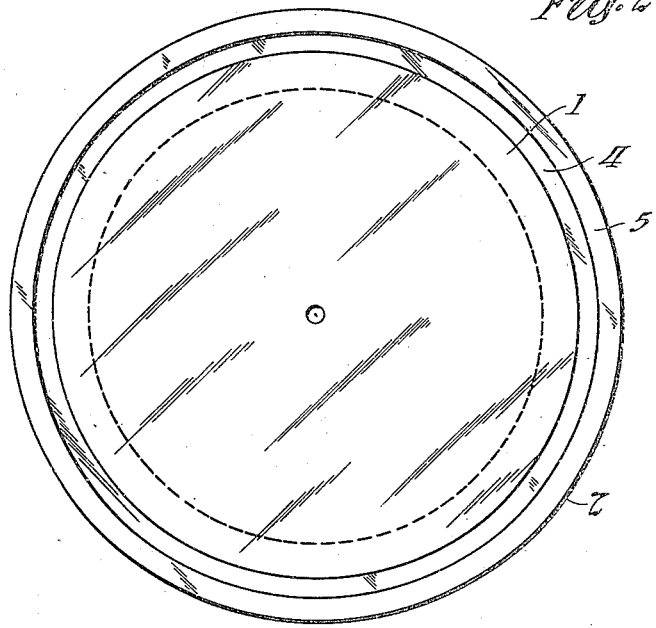

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

MOLD OR TRANSFER PLATE.

1,234,451. Specification of Letters Patent. Patented July 24, 1917.

Application filed October 26, 1912. Serial No. 727,830.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Mold or Transfer Plates, of which the following is a description.

My invention relates to apparatus for molding sound records, the apparatus of the present invention being an improvement on that disclosed in my copending application, Serial No. 694,658, filed May 2, 1912. More particularly, my invention is designed for use in connection with the molding process set forth and claimed in an application of Jonas W. Aylsworth, Serial No. 674,289, filed January 30, 1912. According to this process, a base or backing is provided with a surface veneer or covering of suitable material, the process involving the formation of a surface veneer upon the smooth polished surface of a metallic transfer plate or other blank mold and the transfer of the same to the surface of the object to be coated under heat and pressure with the firm adhesion or welding of the surface veneer to the object. The invention herein claimed relates more particularly to improvements in the construction of the mold or transfer plate above referred to.

In the formation of the surface veneer on the transfer plate or blank mold in carrying on the above named process of Aylsworth, the surfacing material, such as the varnish referred to in the said application of Aylsworth, in a thickly fluid form is coated on the transfer plate or mold preferably by flowing the same over said plate or mold during the rotation of the latter, as disclosed, for example, in my applications, Serial Nos. 727,828 and 727,829 filed on even date herewith. By reason of the rotation of the transfer plate or mold, bubbles and particles of dirt and other foreign matter which are commonly found in the surfacing material are thrown to the periphery of the said plate or mold, the central portion of the coating being homogeneous and substantially free from imperfections. The principal object of the invention herein claimed is to provide a mold or transfer plate whereby the peripheral portion of the coating may be readily removed from the central portion so that a homogeneous veneer free from imperfections may be obtained.

In order that my invention may be more clearly understood, attention is hereby directed to the accompanying drawing forming a part of this specification and in which—

Figure 1 illustrates a central vertical sectional view of a mold or transfer plate embodying my invention and containing a coating or a veneer of surfacing material; and Fig. 2 illustrates a top plan view of the said mold or transfer plate without the veneer or surfacing material. In both the views like parts are designated by the same reference characters.

Referring to the drawing, the numeral 1 designates a circular mold plate having a plane mold surface. The plate 1 is surrounded and detachably supported by a ring 2, the inner diameter of which is smaller than the diameter of the plate 1, the ring 2 being provided with a recess 3 in which the plate 1 is seated and fits closely. A surface 4 is formed on the ring 2 around the recess 3, this surface being flush with the mold surface of the plate 1 when the latter is supported within the said ring. A flange 5 is formed around the surface 4 to prevent the surfacing material, which is shown at 6 in Fig. 1, from flowing over the outer edge of the ring. The plate 1 is preferably formed of German silver and has a polished mold surface, as disclosed in my application, Serial No. 694,658, above referred to, the ring 2 being preferably formed of bronze.

In using the mold or transfer plate described above, the surface material in a viscous thickly fluid form is flowed over the plate 1 and beyond the same over the surface 4, the mold or transfer plate being rotated as disclosed in my before mentioned applications, Serial Nos. 727,828 and 727,829 the surfacing material adhering by reason of its consistency to both the plate 1 and the surface 4 of the ring 2. When the plate 1 is lifted from the ring 2, the portion of the surfacing material over the surface 4 is readily detached from the material on the plate 1. By making the plate 1 of proper diameter and the surface 4 of proper width, the peripheral portion of the veneer containing the bubbles, dirt and other imperfections is completely removed and a homogeneous coating or veneer formed on the plate 1. If the plate 1 has a diameter of about 10¼ inches, the surface 4 may be about ⅛ of an inch in width. It should be noted that the thickened peripheral portion of the coating 6 resulting from the flow of the surface material upward on the inner surface of the flange 5, as shown, is also removed when the plate 1 is lifted from the ring 2; and unevenness in the thickness of the coating or veneer due to this cause is thereby eliminated. The coating or veneer having been applied to the plate 1 as described above, it may now be dried, hardened and applied to the object to be coated in the manner described in the above mentioned application of Aylsworth.

My invention is shown herein in connection with the formation of a veneer for a disk-shaped sound record tablet; but it is not limited to this application, as various changes may be made in the specific construction disclosed without departing from the spirit of the invention.

What I claim as new and desire to protect by Letters Patent of the United States is as follows:

1. As a new article of manufacture, a mold or transfer plate comprising a flat central plate having a smooth mold surface and a ring detachably supporting said plate, said ring fitting closely around said plate and being provided with a surface arranged around and flush with the mold surface of said plate, substantially as described.

2. As a new article of manufacture, a mold or transfer plate comprising a flat central plate having a polished mold surface and a ring provided with a surface arranged closely around and flush with the mold surface of said plate, substantially as described.

This specification signed and witnessed this 25th day of October 1912.

THOS. A. EDISON.

Witnesses:
 FREDERICK BACHMANN,
 MARY J. LAIDLAW.